(12) United States Patent
Booth (10) Patent No.: US 10,112,786 B1
(45) Date of Patent: Oct. 30, 2018

(54) FEEDING MEMBRANE FOR GRAVEL BLOWER

(71) Applicant: Larry Booth, Edgewood, WA (US)

(72) Inventor: Larry Booth, Edgewood, WA (US)

( * ) Notice: Subject to any disclaimer, the term of this patent is extended or adjusted under 35 U.S.C. 154(b) by 1074 days.

(21) Appl. No.: 13/770,896

(22) Filed: Feb. 19, 2013

(51) Int. Cl.
*B65G 37/00* (2006.01)
*B65G 53/48* (2006.01)

(52) U.S. Cl.
CPC .................................. *B65G 53/48* (2013.01)

(58) Field of Classification Search
CPC ................................................. B65G 37/00
USPC ....................................................... 198/523
See application file for complete search history.

(56) References Cited

U.S. PATENT DOCUMENTS

| | | |
|---|---|---|
| 1,670,133 A | 5/1928 | Bernett |
| 2,021,171 A | 11/1935 | Buck |
| 2,315,079 A | 2/1943 | Reeves |
| 2,591,411 A | 4/1952 | Delsman et al. |
| 3,107,867 A | 10/1963 | Svensson et al. |
| 3,161,442 A | 12/1964 | Reed |
| 3,326,608 A | 6/1967 | Layne et al. |
| 3,613,920 A | 10/1971 | Flamm |
| 3,806,199 A | 4/1974 | Aonuma |
| 3,866,769 A | 2/1975 | Morey et al. |
| 3,979,152 A | 9/1976 | Morey et al. |
| 4,025,122 A | 5/1977 | Diemert |
| 4,044,921 A | 8/1977 | Caverly |
| 4,093,082 A | 6/1978 | Goodsell |
| 4,500,228 A | 2/1985 | McDonald et al. |
| 4,598,875 A | 7/1986 | Bronson et al. |
| 4,910,850 A * | 3/1990 | Sugimori et al. ............... 29/240 |
| 4,953,757 A | 9/1990 | Stevens et al. |
| 5,035,543 A | 7/1991 | Medemblik et al. |
| 5,037,152 A | 8/1991 | Hendricks |
| 5,147,156 A | 9/1992 | Guettler et al. |
| 5,163,787 A | 11/1992 | Bjorklund |
| 5,353,911 A | 10/1994 | Akers et al. |
| 5,375,721 A | 12/1994 | Lavinge |
| 5,380,144 A | 1/1995 | Smith et al. |
| 5,410,929 A * | 5/1995 | Wallace .......................... 83/160 |
| 5,439,152 A | 8/1995 | Campbell |
| 5,553,762 A | 9/1996 | Brown |
| 5,566,893 A | 10/1996 | Getz |
| 5,649,656 A | 7/1997 | Davy |
| 5,695,130 A | 12/1997 | Csendes |
| 5,718,539 A | 2/1998 | Segota |
| 5,725,160 A | 3/1998 | Harper et al. |

(Continued)

*Primary Examiner* — Joseph A Dillon, Jr.
(74) *Attorney, Agent, or Firm* — R. Reams Goodloe, Jr.

(57) ABSTRACT

A deformable feeding membrane for an apparatus that pneumatically conveys solid or semi-solid materials, e.g., gravel or crushed rock. The deformable feeding membrane includes a tubular portion adjacent an inlet feed auger. The sidewalls of the tubular portion includes sidewalls that are outwardly deformable, so that gravel or rocks that might otherwise become pinched or stuck between an inner sidewall of the feeding membrane tube and a flyte of a screw auger can pass through the membrane tube, with sufficient space provided by the deflection of the feeding membrane tube wall. In an embodiment, the tubular portion may be provided sufficiently elastic so that the flexible tubular sidewall may be operably displaced a distance delta ($\Delta$), wherein the distance delta ($\Delta$) may be at least as large as the thickness of the sidewalls of the tubular portion.

18 Claims, 7 Drawing Sheets

(56) References Cited

U.S. PATENT DOCUMENTS

| | | |
|---|---|---|
| 5,730,577 A | 3/1998 | Jones |
| 5,743,583 A | 4/1998 | Lowe |
| 5,836,635 A | 11/1998 | Dorman |
| 5,863,155 A | 1/1999 | Segota |
| 5,868,453 A | 2/1999 | Steigner |
| 2012/0277728 A1* | 11/2012 | Weber et al. ................. 604/514 |

* cited by examiner

FEEDING MEMBRANE FOR GRAVEL BLOWER

COPYRIGHT RIGHTS IN THE DRAWING

A portion of the disclosure of this patent document contains material that is subject to copyright protection. The applicant has no objection to the facsimile reproduction by anyone of the patent document or the patent disclosure, as it appears in the Patent and Trademark Office patent file or records, but otherwise reserves all copyright rights whatsoever.

RELATED PATENT APPLICATIONS

None.

TECHNICAL FIELD

This disclosure relates to apparatus and methods for conveyance of particulate or granular materials such as rock, sand, and gravel, and in particular, to systems which are specifically adapted to pneumatically transfer gravel at locations where access is difficult or impossible for other material transport equipment or systems.

BACKGROUND

In various commercial, institutional, or residential construction projects, it is common practice to provide a gravel fill below a poured concrete foundation wall, or to provide gravel simply for ground cover in selected locations. Many sites are easily accessible and relatively clear, and in such instances, the conveyance and spread of gravel is simply accomplished via front end loader, or via use of a "Bobcat" brand loader, or other similar machine. However, from time to time the need arises to place gravel in locations which are not easily reached from a convenient dump or staging location where gravel may be placed for temporary storage. Such sites include those having steep hillsides, or other obstacles. such as closely spaced structures. Consequently, it would be desirable to provide an efficient method for the transport of gravel from a convenient staging area to a desired placement location.

In my prior U.S. Pat. No. 6,089,795, the disclosure of which is incorporated herein in its entirety by this reference (and which was issued Jul. 18, 2000, and entitled Mobile Apparatus for Pneumatic Conveyance of Gravel or Similar Granular Material), I described an apparatus which was capable of meeting certain service requirements in order to achieve reliable conveyance of some materials. However, over the years of operating that apparatus, I found that certain types of materials are likely to result in hopper outlet plugging, or in binding or overload of screw augers, or both. Such problems have been most pronounced when attempting to convey large or irregular sized rock, since such materials often become wedged between the flytes of an auger and adjacent hopper outlet components.

Therefore, it can be appreciated that it would be desirable to provide a pneumatic rock and gravel conveyance system which combines the supply of motive air with a reliable material delivery and entrainment system, and which avoids feed hopper plugging, and which avoids auger binding or overload conditions.

OBJECTS, ADVANTAGES, AND NOVEL FEATURES

I have now invented, and disclose herein, a novel design for an apparatus for pneumatic conveyance of gravel or similar granular material.

From the foregoing, it will be apparent to the reader that an object of the developments described herein resides in the provision of a novel apparatus for pneumatic conveyance of gravel or similar granular material which avoids hopper outlet plugging and screw auger overload problems that have plagued apparatus and methods heretofore used for delivery of gravel, rocks, or other small solids.

Other objects of the developments described herein resides in the provision of an apparatus for pneumatic conveyance of gravel or similar granular material as described herein which:

can be provided on a base for simple, cost effective transport to remote job site locations;

in conjunction with the preceding object, has the advantage that it can be easily and quickly assembled, used as desired, and then quickly re-packed for return to a contractor's home shop location;

which in a relatively inexpensive manner reduces or avoids storage hopper outlet plugging;

which in a relatively inexpensive matter avoids overload and binding of screw augers used to empty feed hoppers;

which deliver solids such as gravel to a pneumatic feed tube via wear resistant, components which are capable of withstanding the required abrasive service for selected particulates being transported;

which reliably provides particulate feed for entrainment by a high velocity gas stream, for injection of gravel into a pneumatic line for conveyance therein.

Other objects, features, and additional advantages of the developments described herein will become apparent to the reader from the foregoing and the appended claims and as the ensuing detailed description and discussion proceeds in conjunction with the accompanying drawing figures.

SUMMARY

I have now invented and disclose herein a novel apparatus for pneumatic conveyance of gravel or similar granular, solid, or semi-solid material. In particular, I have developed an apparatus for pneumatically conveying solid or semi-solid material, such as gravel or crushed rock, which apparatus includes a base, a first hopper mounted on the base, wherein the first hopper has a first hopper bottom that defines a first hopper outlet. For the apparatus, I have further developed a deformable feeding membrane tube that is operatively connected to the first hopper outlet. In an embodiment, the first hopper further includes an agitator such as a screw auger, which extend into the first hopper outlet and into at least a portion of the deformable feeding membrane tube. The first hopper is adapted for receiving and temporarily holding a charge volume of the solid or semi-solid material to be conveyed, and for discharge of the solid or semi-solid material through the first hopper outlet into the deformable feeding membrane tube, and thence into said pneumatic pickup tube.

The deformable feeding membrane tube is provided having sidewalls that are outwardly deformable, so that gravel or rocks that might otherwise become pinched or stuck between an inner sidewall of the feeding membrane tube and the screw auger can pass through the membrane tube, with sufficient space provided by the deflection of the feeding membrane tube wall. In an embodiment, the deformable feeding membrane tube is provided having a converging portion provided in the shape of a truncated conoid, and tubular portion having a flexible sidewall of thickness T. In an embodiment, the tubular portion may be provided sufficiently elastic so that the flexible tubular sidewall may be operably displaced a distance delta ($\Delta$). In an embodiment, the distance delta ($\Delta$) may be at least as large as said thickness T. In an embodiment, the flexible membrane feeding tube may be provided in the form of an elastomeric tube fabricated from rubber.

BRIEF DESCRIPTION OF THE DRAWING

An apparatus for pneumatic conveyance of gravel, and the use of a novel feeding membrane tube will be described by way of exemplary embodiments, using for illustration the accompanying drawing in which like reference numerals denote like elements, and in which.

The foregoing figures, being merely exemplary, contain various elements that may be present or omitted from various membrane feeding tubes, and apparatus for pneumatically conveying gravel, utilizing the principles taught herein, or that may be implemented in various embodiments for such feeding tubes. Other variations in feeding tube designs may use slightly different mechanical properties, or different compositions or structural materials, yet employ the principles described herein or depicted in the drawing figures provided. An attempt has been made to show the figures in a way that illustrates at least those elements that are significant for an understanding of exemplary flexible feeding tubes for pneumatic gravel conveyance systems.

It should be understood that various features may be utilized in accord with the teachings hereof, as may be useful in different embodiments as necessary or useful for various sizes and shapes of flexible feeding tubes, or different sizes or capacities for such pneumatic conveyance machines, depending upon the conditions of service, distance for conveyance, desired equipment life and wear properties, and other variables, yet be provided within the scope and coverage of the teachings herein as defined by the claims set forth herein.

DETAILED DESCRIPTION

Figure 1:
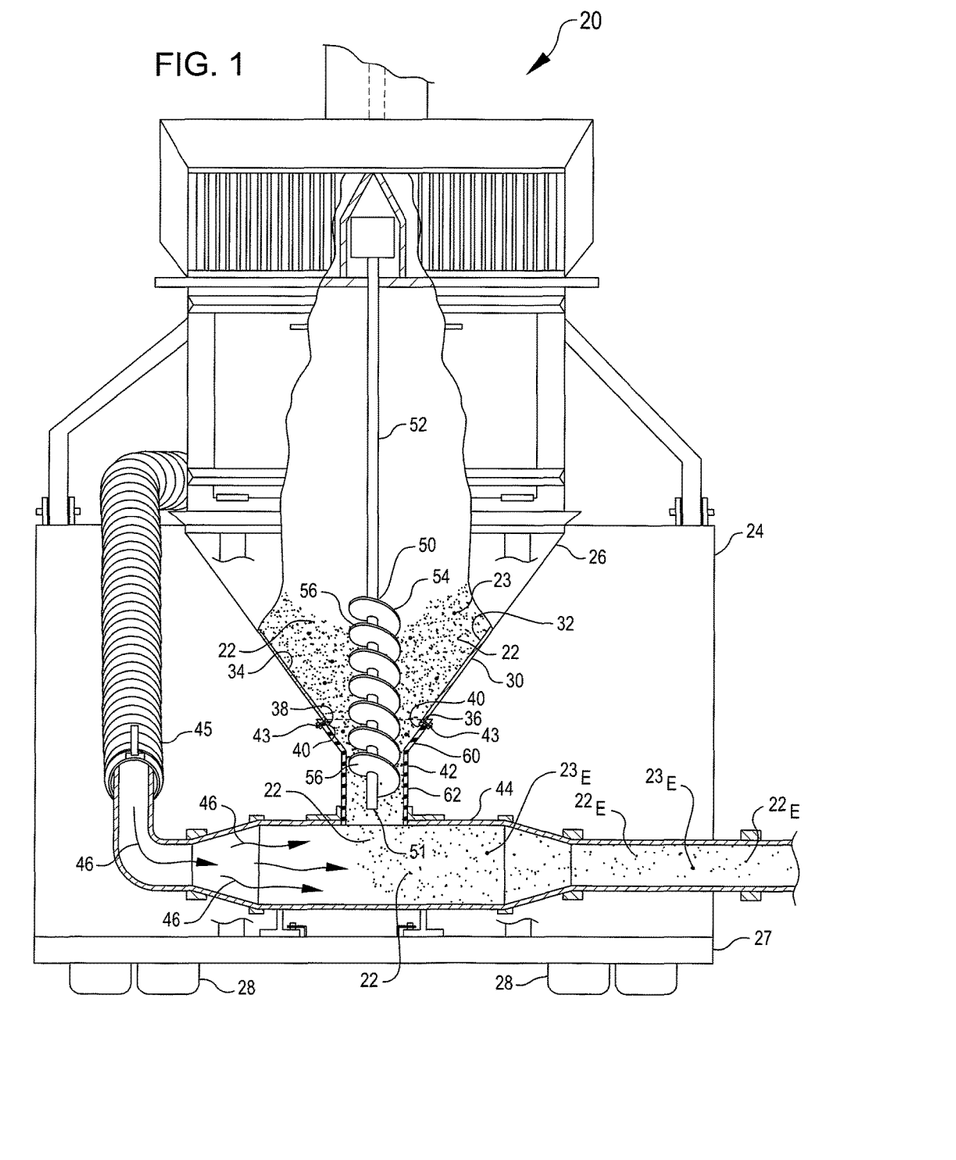
FIG. 1 is side view of an embodiment for an apparatus for pneumatic conveyance of gravel, showing a single feed hopper containing solid or semi-solid material therein, with the hopper having sloping sidewalls and a screw augur therein, and a flexible feeding membrane tube adjacent the distal end of the screw auger, with the feeding membrane tube connecting the feed hopper to a pneumatic pickup tube.

Attention is directed to FIG. 1, where an embodiment for an apparatus 20 for pneumatically conveying solid or semi-solid material 22 is provided. In an embodiment, the solid or semi-solid material 22 may be gravel. In an embodiment, the solid or semi-solid material may include oversize material 23 such as irregularly shaped rocks. The apparatus includes a base 24 on which at least some of the components of the apparatus may be mounted, such as a first hopper 26. In an embodiment, the base 24 may be formed with, or placed on, a mobile platform, such as on a truck bed 27 (see tandem wheel set 28), or on a trailer bed (not shown).

In an embodiment, a first hopper 26 mounted on the base 20 may include a first hopper bottom 30 having sidewalls such as sloping sidewalls 32 and 34, that define at the lower reaches thereof (36 and 38 respectively), a first hopper outlet 40. A flexible, deformable feeding membrane 42 is operatively connected to the first hopper outlet 40. In an embodiment, fasteners 43 may be used to fasten the deformable feeding membrane 42 to the first hopper outlet 40. A pneumatic pickup tube 44 is operatively coupled to the deformable feeding membrane 42. The first hopper 26 is adapted for receiving and temporarily holding a charge volume of the solid or semi-solid material 22 to be conveyed, for discharge of the solid or semi-solid material 22 through the first hopper outlet 40 and into the deformable feeding membrane 42, and thence into the pneumatic pickup tube 44. In an embodiment, an air blower (not shown) may be operatively coupled via air blower outlet tube 45 to the pneumatic pickup tube 44. A suitable air blower may be adapted to intake ambient air and to output air (see reference arrows 46) under pressure and at a velocity sufficient to entrain the solid or semi-solid material 22 entering the pneumatic pickup tube 44 for carriage of the entrained solid or semi-solid material 22E or 23E away from the pneumatic pickup tube 44, as noted in FIG. 1.

In an embodiment, the first hopper 26 further includes an agitator such as a screw auger 50. In an embodiment, the agitator, here screw auger 50, extends into said first hopper outlet 40 and into at least a portion of the deformable feeding membrane 42. In an embodiment, a screw auger 50 may include an axially extending shaft 51, having a smooth shaft portion 52, and a flyted portion 54 having a preselected number of flytes 56 thereon. In an embodiment, the flight portion 54 may extend only partway into the interior volume of first hopper 26. In an embodiment, the screw auger 50 may be provided as an adjustable speed screw auger, so that the rotational speed of the screw auger may be varied for particular materials or feed rates. In an embodiment, a screw auger 50 may be generally vertically mounted, and in such a configuration, comprises an axially extending shaft 50 having an outer end 51, wherein said outer end of said shaft and adjacent flytes 56 extend into the deformable feeding membrane 42. In operation, the screw auger 50 is adapted upon rotation to urge discharge of the solid or semi-solid material 22 downwardly and outwardly through the deformable feeding membrane 42 and toward the pneumatic pickup tube 44.

Figure 3:
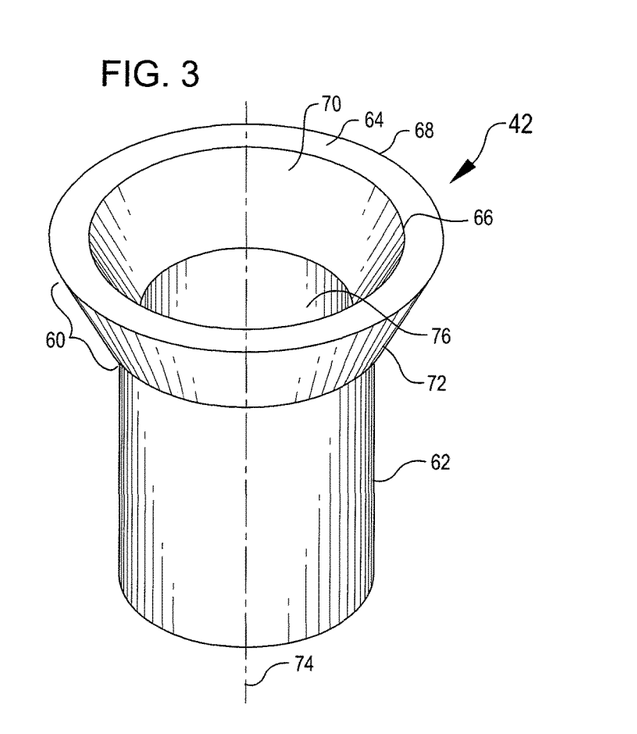
FIG. 3 is a perspective view of a flexible membrane feeding tube, for use in the apparatus depicted in FIGS. 1 and 2.

As better seen in FIG. 3, in various embodiments, the deformable feeding membrane 42 may be provided in the form of an elastomeric material having a generally tubular configuration. In an embodiment, the deformable feeding membrane 42 may include a converging portion 60 and a tubular portion 62. In an embodiment, the converging portion 60 may be configured in the shape of a truncated conoid. In this specification and in the claims set forth herein below, the term conoid should be given its ordinary and plain meaning. However, as can be understood by reference to FIGS. 3, 4, and 5, it should be understood that, in general, a conoid shape shall include a form resembling a cone, in that an inlet 64 to the deformable feeding membrane 42 may be provided in a ring-like shape having inner 66 and outer 68 perimeters. The converging portion 60 may have interior sidewalls 70 and outer sidewalls 72 that may taper toward an apex from their respective directrix (i.e., the inner 66 and outer 68 perimeters of the inlet 64, for each of the respective interior sidewalls 70 and outer sidewalls 72 of the converging portion 60 of the deformable feeding membrane 42), even though the solid may be entirely truncated prior to reaching such apex. In an embodiment, a selected directrix may be circular, and in such event, the inner and outer directrix may define an annulus, and a circular shaped truncated cone may be provided for converging portion 60.

In an embodiment, a suitable elastomeric material for the composition of deformable feeding membrane 42 may be formed using a rubber compound. In an embodiment, a suitable rubber compound may be formulated using SBR type rubber, that is, styrene butadiene rubber. A broad range of compositional mixtures, as will be known to those in the art, may reasonably be anticipated to provide sufficient flexibility for functional achievement as described herein, and provide sufficient toughness and surface hardness for long wear life in the conveyance of materials such as gravel and crushed rock. In an embodiment, the converging portion 60 may be oriented about central axis 74. In an embodiment, the interior sidewalls 70 may slope inwardly toward the central axis 74. In an embodiment, wear portions of the deformable feeding membrane may be provided having a Shore A hardness in the range of about 60, more or less, in order to provide adequate hardness for operational wear, to provide adequate service life. In an embodiment, the tubular portion 62 includes an interior wall 76. In an embodiment, the interior sidewalls 70, or the interior wall 76, or both, may have a Shore A hardness of about 60, or more. In an embodiment, the interior sidewalls 70, or the interior wall 76, or both, may have a Shore A hardness of about 60, or more. In an embodiment, the interior sidewalls 70, or the interior wall 76, or both, may have a Shore A hardness of about 60, or more.

Figure 5:
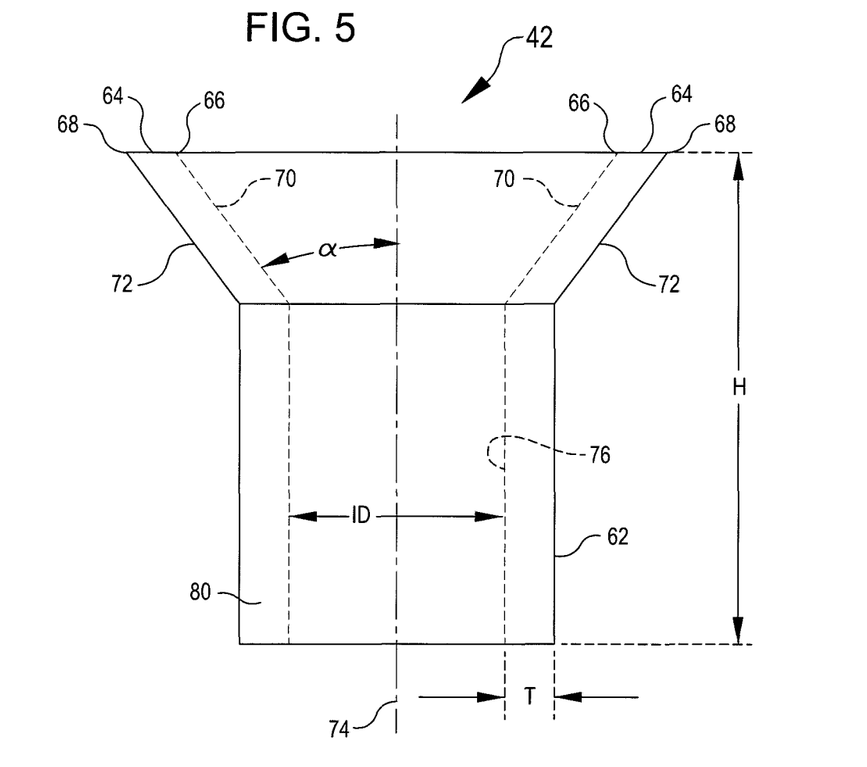
FIG. 5 is a side view of flexible membrane feeding tube.

As can be seen by reference to FIG. 5, in an embodiment, the interior sidewalls 70 may be configured to slope inwardly at a constant angle alpha ($\alpha$). In an embodiment, the angle alpha ($\alpha$) may be provided at about twenty five degrees (25°), or more. In an embodiment, the angle alpha ($\alpha$) may be provided at from about twenty five degrees (25°), to about thirty seven degrees (37°). In an embodiment, the angle alpha ($\alpha$) may be provided at about thirty seven degrees (37°), or more.

Figure 4:
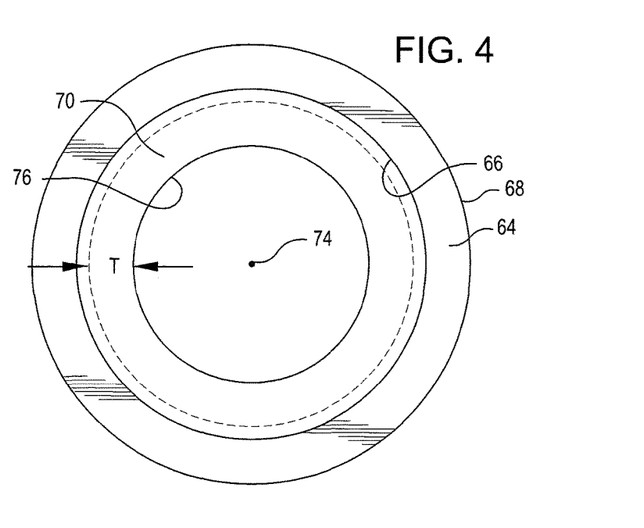
FIG. 4 is a top view, taken looking down at the inlet to a flexible membrane feeding tube, for use in the apparatus depicted in FIGS. 1 and 2.

As further seen in FIGS. 4 and 5, in an embodiment, the tubular portion 62 may be provided in a cylindrical configuration. In an embodiment the tubular portion 62 may be provided having an inside diameter ID of from about five (5) inches to about twelve (12) inches. In various embodiments, the tubular portion 62 may be provided having a flexible sidewall 80 of uniform wall of thickness T. In an embodiment, the thickness T may be about one (1) inch. In an embodiment, the thickness T may be about one (1) inch, or less. In an embodiment, the thickness T may be about one (1) inch, or more.

Figure 6:
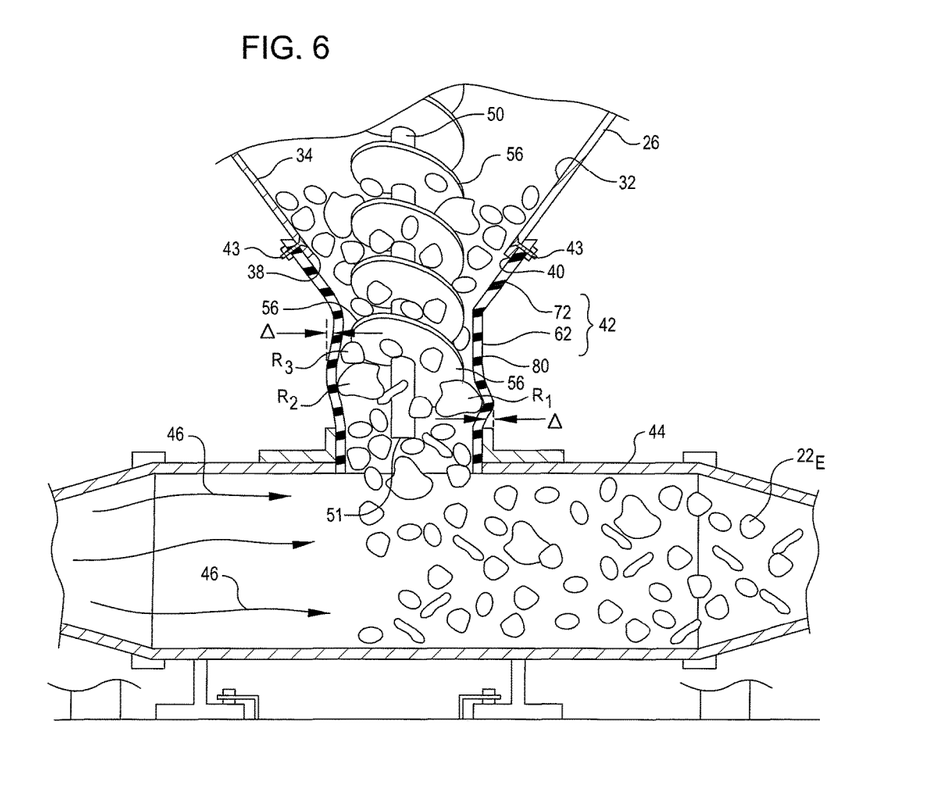
FIG. 6 shows a flexible membrane feeding tube, in operation, with gravel being fed through the feeding tube to a pneumatic pickup tube in a apparatus for pneumatically conveying solid or semi-solid material, and illustrating the flexible membrane walls which allow rocks to deform the feeding tube sidewall, so as to avoid binding of rocks between the feeding tube and the screw auger.

As seen in FIG. 6, in an embodiment, the deformable feeding tube 42 may be provided wherein the tubular portion 62 is sufficiently elastic so that the flexible sidewall 80 may be operably displaced a distance delta ($\Delta$), for example, when rocks, such as R1, or R2, or R3, are oversize, or impinge between flytes 56 and interior sidewall 76. In an embodiment, the deformable feeding tube 42 may be provided wherein the tubular portion 62 is sufficiently elastic so that the flexible sidewall 80 may be operably displaced a distance delta ($\Delta$), for example, that is at least as large as the thickness T of the flexible sidewall 80. In an embodiment, the deformable feeding tube 42 may be provided wherein the tubular portion 62 is elastic so that the flexible sidewall 80 may be operably displaced by a distance delta ($\Delta$), for example that is up to as much as the thickness T of the flexible sidewall 80.

In an embodiment, the deformable membrane 42 may be provided having an overall height H of about twelve (12) inches, or more. In an embodiment, the deformable membrane 42 may be provided having an overall height H of about sixteen (16) inches, or more. In various embodiments, the apparatus 20 may be provided in a configuration that has the ability to convey solid or semi-solid material 22 having a maximum dimension of up to one (1) inch in size. In various embodiments, the apparatus 20 may be provided in a configuration that has the ability to convey solid or semi-solid material 22 having a maximum dimension of at least minus seven/eighths inch (−⅞") size.

Figure 2:
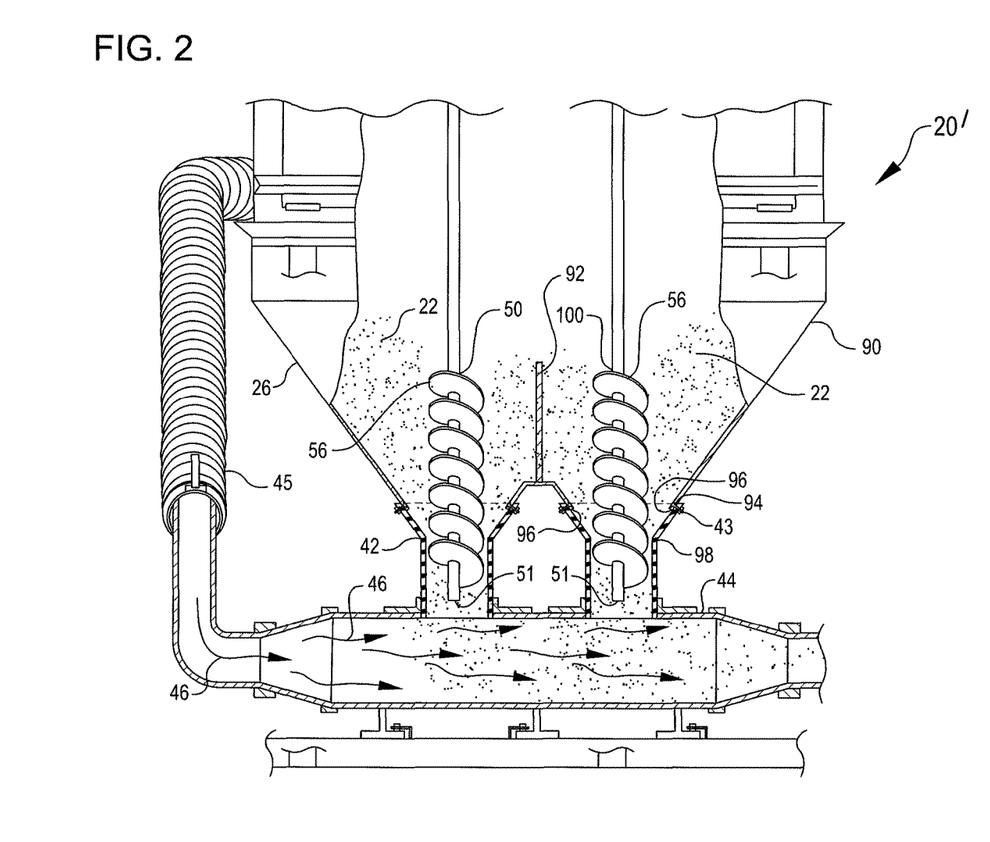
FIG. 2 is side view of another embodiment for an apparatus for pneumatic conveyance of gravel, showing a double feed hopper containing solid or semi-solid material therein, with the hopper having sloping sidewalls and screw augurs for each of the double hoppers, and a flexible feeding membrane tube adjacent the distal end of each screw auger, with a feeding membrane tube connecting the respective feed hopper to a common pneumatic pickup tube.

Returning now to FIG. 2, in can be appreciated that in another embodiment, an apparatus 20' may be provided utilizing a second hopper 90. The second hopper 90 and a first hopper 26 may be configured to share a common center divider portion 92. In various embodiments, whether the second hopper 90 is a standalone hopper, or utilizes components in common with first hopper 26, other components as can be seen in FIG. 2 may be provided as mentioned with respect to first hopper 26, to facilitate feed of solid or semi-solid material 22. For example, the second hopper 90 may include a second hopper bottom 94 that defines a second hopper outlet 96. A second deformable feeding membrane 98 may be operatively connected to the second hopper outlet 96. The second hopper 90 may be provided with a second agitator, such as second screw auger 100, which extends into the second hopper outlet 96 and into at least a portion of the second deformable feeding membrane 98. The second deformable feeding membrane 98 may be operatively coupled to the pneumatic pickup tube 44. Like the first hopper 26, the second hopper 90 may be adapted for receiving and temporarily holding a charge volume of the solid or semi-solid material 22 to be conveyed, and for discharge of the solid or semi-solid material 22 through the second hopper outlet 96 into the second deformable feeding membrane 98, and thence into the pneumatic pickup tube 44. In various embodiments, the second deformable feeding membrane 98 may be coupled, for example using fasteners 43, to second hopper 90 at or adjacent the second hopper outlet 96.

Generally, an apparatus 20 or 20' may, in an embodiment, be configured using an over-the-road vehicle chassis having a cab and drive engine suitable for moving the vehicle to a pre-selected remote location. The vehicle may be provided with a suitable base 24 on which equipment apparatus 20 is mounted. In an embodiment, a primary hydraulic power generator may be mounted on the vehicle base, as is a first hopper 26 and optionally, second hopper 90, each adapted for receiving and temporarily holding a preselected charge volume of the solid or semi-solid material 22 to be conveyed. A hydraulically driven air blower may be mounted on the vehicle base 24, adapted to intake ambient air and to provide output air under pressure, typically from between about 10 and 15 psig. A pneumatic pickup tube 44 is provided to receive the output air under pressure from the air blower and to entrain the solid or semi-solid material 22 to be conveyed as the solid or semi-solid material 22 is discharged from the first hopper 26 and optionally, second hopper 90. An agitator, such as a hydraulically driven transfer mechanism, in an embodiment a screw auger 50 may be used for urging the solid or semi-solid material 20 to be conveyed from the first hopper 26 to the pneumatic pickup tube 44. For conveyance of the solid or semi-solid material 22, a plurality of pneumatic tube elements (not shown but depicted in the referenced prior patent incorporated herein) may be provided, formed into a flexible network for carriage of the solid or semi-solid material from a proximal end sealingly connected to the pneumatic pickup tube 44 to a distal, discharge end. At the distal or discharge end, a catch can may be attached in a substantially pneumatically sealed connection to the distal or discharge end of the network of pneumatic tube elements, to catch the solid or semi-solid material 22 being conveyed and to downwardly direct the solid or semi-solid material 22 for discharge at a desired remote location. For each of the pneumatic tube elements, I prefer plastic pipe sections in PVC (polyvinyl chloride) or ABS (acrylonitrile butadiene styrene) material, of nominal six (6) inches diameter and in schedule 40 thickness. A network of pneumatic tube elements of up to about one thousand foot (1000') in length can be utilized for transporting solid or semi-solid materials 22 at the rate of at least ten (10) cubic yards per hour, and in an embodiment, at the rate of up to at least twenty (20) cubic yards per hour, and in another embodiment, at any desired rate up to about thirty (30) cubic yards per hour, or in yet a further embodiment, at a rate of up to about forty five (45) cubic yards per hour, or more, depending upon the quality of the material being transported, the size, distance involved, and the terrain presented. These rates can be achieved when handling solid or semi-solid materials 22 from as low as granulitic sand, through common sizes in the range of about one-quarter inch (¼") in size up to about one inch (1") in size, and even when handling materials up to as large as three inch minus (−3") rock (i.e. rock that will fit through a three inch by three inch sieve). For maximum speed and efficiency, I prefer to limit material size to about a seven eighths inch minus (−⅞") particle size. When using a Bobcat® brand front end loader, somewhere between 10 and 15 cubic yards per hour is a typical comfortable rate with a single operator handling the feed inputs of the solid or semi-solid material 22.

Figures 7, 9:
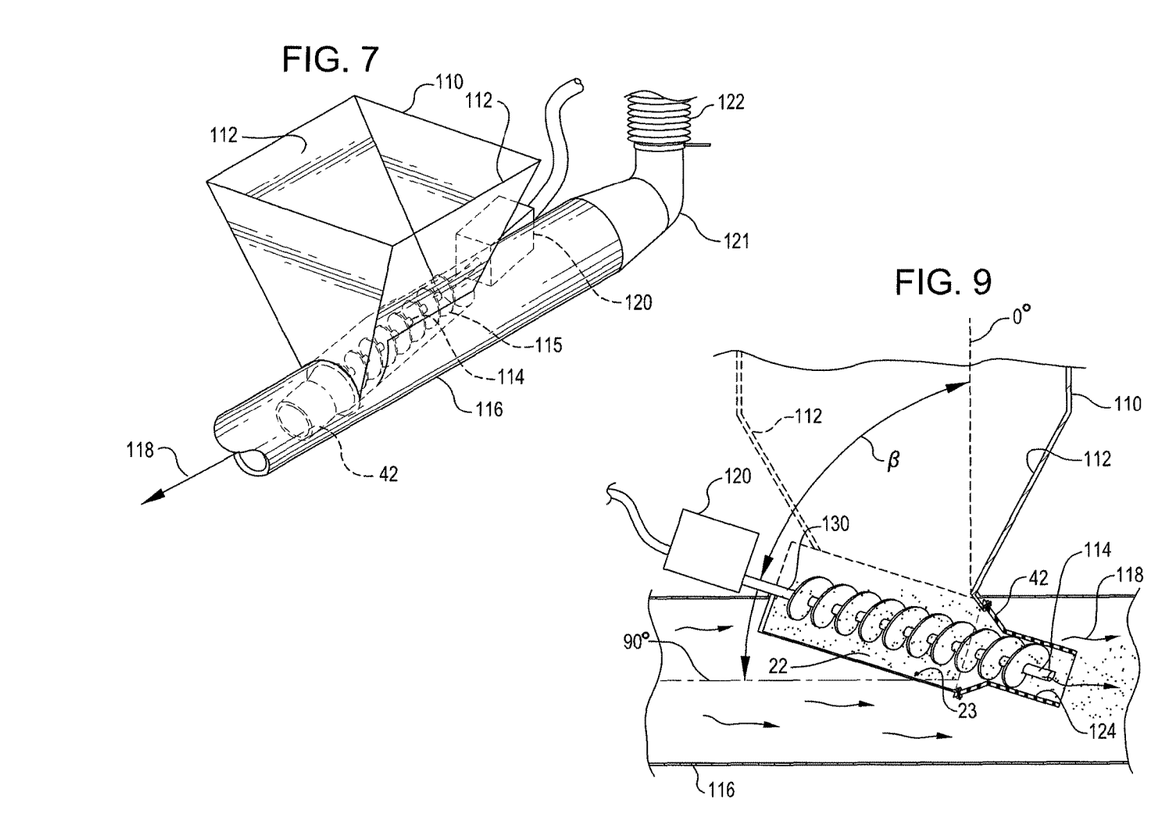
FIG. 7 is a conceptual drawing, illustrating a flexible membrane feeding tube during operation, with gravel being fed to the feeding tube and thence into a pneumatic pickup tube in a apparatus for pneumatically conveying solid or semi-solid material, and illustrating the use of an inclined screw auger to remove solid or semi-solid material such as gravel from a feed hopper.
FIG. 9 is a diagrammatic view, showing that a screw auger may be mounted in any position, from vertical (discharging downward) to horizontal (discharging outwardly) in connection with a hopper of compatible design., and that in connection therewith, a flexible membrane feeding tube may be utilized, regardless of orientation, to provide a feeding tube that may flex with various sizes of gravel, to avoid the problem of gravel binding against the auger.
Figure 8:
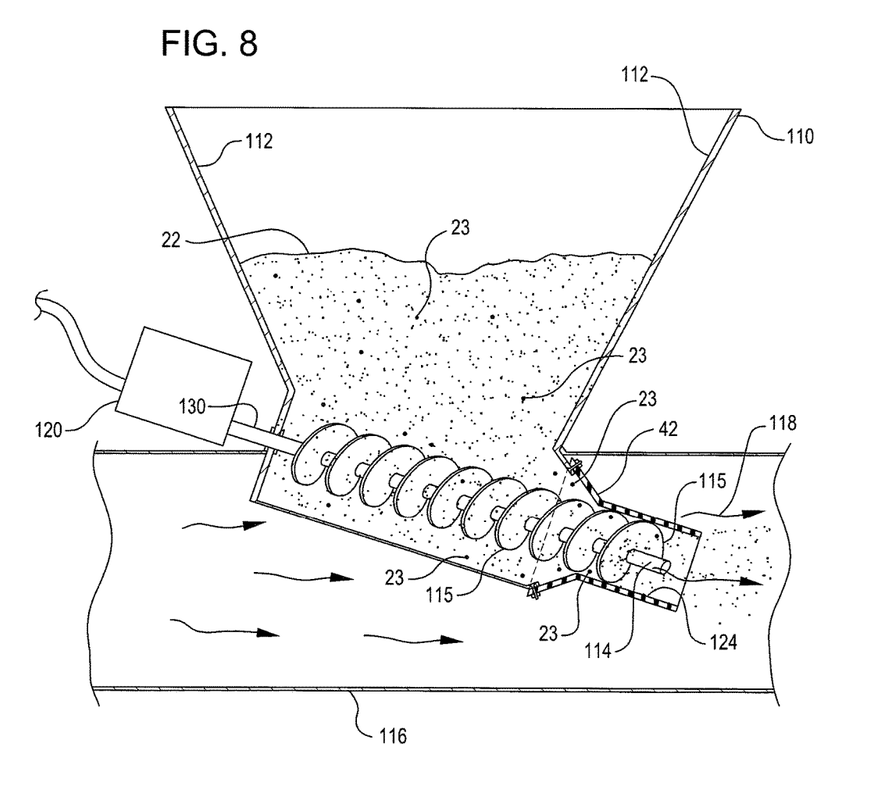
FIG. 8 is a cross-sectional view of the apparatus shown in the conceptual drawing just provided in FIG. 7 above, now further including gravel to be conveyed, and illustrating use of an inclined screw auger to operate to provide gravel to a flexible membrane feeding tube, and in which the flexible membrane feeding tube may flex with various sizes of gravel that might otherwise bind the feeding tube, and showing gravel of various sizes being fed to the feeding tube and thence into a pneumatic pickup tube pickup and pneumatic conveyance of the gravel.

Attention is now directed to FIGS. 7 and 8, which provide conceptual illustrations of a flexible membrane feeding tube 42 set up for operation, with a feed hopper 110 provided with sloping sidewalls 112 to feed a solid or semi-solid material 22 and accompanying oversized rock 23 placed therein (see FIG. 8) to a screw auger 114 located at or near the bottom of the feed hopper 110. Use of the flexible membrane feeding tube 42 enables injection of the solid or semi-solid material 22 such as gravel with oversize rocks 23 to a pneumatic pickup tube 116, which is fed with high velocity air in the direction of reference arrow 118. Such high velocity air may be provided via connecting pipe 120 and flexible tubing 122 from a selected air compressor (not shown). As shown in FIGS. 7 and 8, the screw auger 114 may be oriented in an inclined fashion, i.e., sloping so that the solid or semi-solid material 22 being carried by the screw auger 114 is assisted by gravity downward and forward along flytes 115 of screw auger 114. The screw auger 114 may be driven by a motor 120, which may be driven by a selected method, such as hydraulically, pneumatically, or electrically.

Some operational details are shown in FIG. 8, which is a cross-sectional view of the apparatus shown in the conceptual drawing just provided in FIG. 7, showing feed hopper 110 in cross-section, but now additionally showing some solid or semi-solid material 22 such as gravel and rock 23 being conveyed. Also, some details of the inclined screw auger 114 are shown, and it can be appreciated that flytes 115 may urge oversize rocks 23 against an inner sidewall 124 of flexible membrane feeding tube 42, yet continue to operate to provide rock 23 and gravel 22 through the flexible membrane feeding tube, since the flexible membrane feeding tube may flex with various sizes of rocks 23 that might otherwise bind the feeding tube.

Finally, attention is directed to FIG. 9 which provides a diagrammatic illustration showing that a screw auger 114 may be mounted in various position, such as where the drive shaft 130 of the screw auger 114 may be oriented at an angle beta (β) anywhere from vertical (discharging straight downward, at an angle beta (β) of zero degrees) to horizontal (discharging straight outwardly at an angle beta (β) of ninety (90) degrees), in combination with a feed hopper 110 of compatible design. Thus, it can be appreciated that, with suitable feed equipment design, a flexible membrane feeding tube 42 may be utilized, regardless of orientation of a screw auger 114, to avoid the problem of gravel binding against the screw auger 114.

In summary, my novel flexible membrane feeding tube for a use in an apparatus for pneumatic conveyance of gravel or similar solid or semi-solid material, e.g. gravel or crushed rock, provides a simple design for quick field assembly of reliable gravel pumping machinery. The design provides a significant improvement in the art by reducing operating complexity of gravel conveying systems, and by minimizing or eliminating the tendency of gravel to bind between a hopper outlet tube and an adjacent screw auger. In various embodiments, the components taught herein may be provided as suitable for compact placement of gravel conveying apparatus on a single vehicle, so that overall project costs are reduced, while providing significantly improved operational reliability, compared to various prior art apparatus which I have used or which is otherwise known to me.

In the foregoing description, for purposes of explanation, numerous details have been set forth in order to provide a thorough understanding of the disclosed exemplary embodiments for the design of a feeding tube for a pneumatic gravel conveyance apparatus. However, certain of the described details may not be required in order to provide useful embodiments, or to practice selected or other disclosed embodiments. Further, for descriptive purposes, various relative terms may be used. Terms that are relative only to a point of reference are not meant to be interpreted as absolute limitations, but are instead included in the foregoing description to facilitate understanding of the various aspects of the disclosed embodiments. And, various actions or activities in any method described herein may have been described as multiple discrete activities, in turn, in a manner that is most helpful in understanding the developments in the art as described herein. However, the order of description should not be construed as to imply that such activities are necessarily order dependent. In particular, certain operations may not necessarily need to be performed precisely in the order of presentation. And, in different embodiments of the developments in the art as described herein, one or more activities may be performed simultaneously, or eliminated in part or in whole while other activities may be added. Also, the reader will note that the phrase "in an embodiment" or "in one embodiment" has been used repeatedly. This phrase generally does not refer to the same embodiment; however, it may. Finally, the terms "comprising", "having" and "including" should be considered synonymous, unless the context dictates otherwise.

From the foregoing, it can be understood by persons skilled in the art that a novel feeding membrane tube for a pneumatic gravel conveyance apparatus has been described herein. Although only certain specific embodiments have been shown and described, there is no intent to limit the claimed subject matter to merely such embodiments.

Further, the aspects and embodiments described and claimed herein may be modified from those shown without materially departing from the novel teachings and advantages provided, and may be embodied in other specific forms without departing from the spirit or essential characteristics thereof. Therefore, the embodiments presented herein are to be considered in all respects as illustrative and not restrictive or limiting. As such, this disclosure is intended to cover the structures described herein and not only structural equivalents thereof, but also equivalent structures. Numerous modifications and variations are possible in light of the above teachings. Therefore, the protection afforded to the developments described herein should be limited only by the appended claims and their legal equivalents.

I claim:

1. An article of manufacture, comprising:
   a gravel blower feeding tube, said gravel blower feeding tube comprising a deformable membrane, said deformable membrane comprising an elastomeric tube, said elastomeric tube having a converging portion having an inlet and a tubular portion having an outlet,
   said converging portion provided in the shape of a truncated conoid,
   said tubular portion having a flexible sidewall, said flexible sidewall elastically displaceable laterally a distance of at least one (1) inch.

2. The article of manufacture as set forth in claim 1, wherein said flexible sidewall has a thickness T of about one (1) inch, or less.

3. The article of manufacture as set forth in claim 1, wherein said flexible sidewall has a thickness T of one (1) inch, or more.

4. The article of manufacture as set forth in claim 1, wherein said elastomeric tube comprises neoprene rubber.

5. The article of manufacture as set forth in claim 1, wherein said elastomeric tube has a Shore A hardness of about 60, or more.

6. The article of manufacture as set forth in claim 1, wherein said converging portion is oriented about central axis, and wherein said converging portion comprises interior sidewalls sloping inwardly toward said central axis.

7. The article of manufacture as set forth in claim 6, wherein said interior sidewalls slope inwardly at a constant angle alpha ($\alpha$).

8. The article of manufacture as set forth in claim 7, wherein said angle alpha ($\alpha$) is about twenty five degrees (25°), or more.

9. The article of manufacture as set forth in claim 7, wherein said angle alpha ($\alpha$) is about thirty seven degrees (37°), or more.

10. The article of manufacture as set forth in claim 1, wherein said tubular portion is cylindrical.

11. The article of manufacture as set forth in claim 10, wherein said tubular portion has an inside diameter of from about five (5) inches to about twelve (12) inches.

12. The article of manufacture as set forth in claim 1, wherein said deformable membrane has an overall height H, from said inlet to said outlet, of about twelve (12) inches, or more.

13. The article of manufacture as set forth in claim 1, wherein said deformable membrane has an overall height H, from said inlet to said outlet, of about sixteen (16) inches, or more.

14. The article of manufacture as set forth in claim 1, wherein said flexible sidewall of said tubular portion of said deformable membrane is laterally displaceable a distance of from at least one (1) inch to about three (3) inches.

15. An article of manufacture, comprising:
    a gravel blower feeding tube for use in combination with a screw auger for the feed of gravel to a pneumatic gravel blower, said gravel blower feeding tube comprising a deformable membrane, said deformable membrane comprising an elastomeric tube having (a) a converging portion having an inlet and (b) a tubular portion having an outlet,
    said converging portion provided in the shape of a truncated conoid, and
    said tubular portion having a flexible sidewall, said flexible sidewall elastically displaceable laterally a distance of at least one (1) inch.

16. The article of manufacture as set forth in claim 15, wherein said flexible sidewall has a thickness T of about one (1) inch, or less.

17. The article of manufacture as set forth in claim 15, wherein said flexible sidewall has a thickness T of one (1) inch, or more.

18. The article of manufacture as set forth in claim 15, wherein said elastomeric tube comprises neoprene rubber.

* * * * *